United States Patent [19]

Jones

[11] Patent Number: 5,281,493

[45] Date of Patent: Jan. 25, 1994

[54] TERMINAL CONSTRUCTION FOR A BATTERY

[75] Inventor: Kenneth R. Jones, Oconomowoc, Wis.

[73] Assignee: Globe-Union Inc., Milwaukee, Wis.

[21] Appl. No.: 940,486

[22] Filed: Sep. 4, 1992

[51] Int. Cl.$^5$ .......................................... H01M 2/30
[52] U.S. Cl. .................................... 429/179; 429/182
[58] Field of Search .............. 429/179, 178, 121, 182, 429/123; 439/754, 755

[56] References Cited

U.S. PATENT DOCUMENTS

| | | | |
|---|---|---|---|
| 3,767,467 | 10/1973 | Miller et al. | 429/179 |
| 3,928,079 | 12/1975 | Jennings et al. | 429/179 |
| 4,396,692 | 8/1983 | Eberle | 429/179 |
| 4,446,214 | 5/1984 | Mocas | 429/179 |
| 4,645,725 | 2/1987 | Kump et al. | 429/179 |
| 4,701,386 | 10/1987 | Kump et al. | 429/179 |
| 4,752,543 | 6/1988 | Anderson et al. | 429/179 |

Primary Examiner—Anthony Skapars
Attorney, Agent, or Firm—Andrus, Sceales, Starke & Sawall

[57] ABSTRACT

A lead-acid battery having an improved side terminal construction. The battery includes a case formed of dielectric material and a plurality of positive and negative plates are located within the case. Each group of plates is electrically connected to a strap. One end of an elongated conductor bar projects through the side wall of the case and is welded to each strap, while the opposite end of the bar projects outwardly of the case and is provided with a recess which receives a metal nut. A cable clamping ring is attached to the opposite end of the conductor bar by a bolt which is threaded in the nut. If a longer than required bolt is inadvertently threaded into the nut, the opposite end of the bar will be deflected or bent as the bolt is threaded down, but the welded connection between the conductor bar and the strap will not be adversely effected.

13 Claims, 1 Drawing Sheet

TERMINAL CONSTRUCTION FOR A BATTERY

BACKGROUND OF THE INVENTION

Lead-acid batteries as used in automobiles, lighting, and the like, are produced in a top terminal configuration, as well as a side terminal configuration. With a top terminal design, tapered terminals project upwardly from the top wall of the case and receive cable clamps.

In a side terminal design, the terminals extend outwardly of the side wall and in a typical design, each terminal includes a lead bushing which is mounted within a recess in the side wall of the case. The inner end of the bushing projects through an opening in the side wall of the case and is welded to a conductor strap which is connected to the electrode plates.

In the typical side terminal construction, a stainless steel nut is mounted within a recess in the outer surface of the lead bushing and the cable clamping ring is connected to the bushing by a bolt, which is threaded within the stainless steel nut.

A side terminal battery has certain advantages over a top terminal configuration. The side terminal design provides a lower profile for the battery and as the terminals are located along the side wall, they are removed from the vents in the top wall of the case, through which hydrogen and oxygen can be vented. In addition, with a side wall terminal design, electrical conductive contaminants cannot collect on the side wall and bridge the terminals, as can occur with a top terminal construction.

However, a problem has arisen with side terminal designs, in that if the original bolt is lost or misplaced, the user will invariably substitute a replacement bolt, which has a longer length than required. As the longer bolt is threaded into the nut to clamp the cable to the bushing, the inner end of the longer bolt will bottom out and as torque is continued to be applied to the bolt, the bottom of the malleable lead bushing will deform and in some instances the deformation of the bushing will break the weld between the bushing and the strap. This can result in arcing if a heavy load is encountered, which results in an ignition source and rapid combustion of the hydrogen gas within the battery.

SUMMARY OF THE INVENTION

The invention is directed to a lead acid battery having an improved side terminal construction, and in particular to a side terminal construction which will prevent rupture of the electrical connection in the event a longer than required bolt is employed to join the cable to the terminal.

The battery can be a standard lead-acid type, including a dielectric case, preferably formed of plastic material, that contains a plurality of positive plates and negative plates, which are spaced apart by separators. A liquid electrolyte, such as sulfuric acid, is impregnated within the separators.

The positive plates, as well as the negative plates, are each connected to a strap which extends to the side wall of the case, and each strap is connected to the respective side terminal through an elongated, conductor bar, preferably formed of a lead alloy. The conductor bar has a first or inner end which projects inwardly through an opening in the side wall of the case and is welded to the strap, while the outer, or second end of the bar, is laterally offset from the first end and is provided with an outwardly facing recess which receives a metal threaded nut. A clamping ring of the battery cable is connected to the conductor bar by a bolt which is threaded within the nut.

The nut is relatively shallow in depth and if the original bolt is lost or misplaced there is a tendency for the user to substitute a replacement bolt of greater length. When the replacement bolt is threaded into the nut and turned down with substantial torque, the longer bolt may deform the end of the malleable lead conductor bar, forming an inner protrusion which, in turn, will bend the outer or second end of the bar outwardly. However, even if the second end of the conductor bar is deformed by excessive torque being applied to the bolt, the connection between the inner end of the conductor bar to the strap will not be effected, so that the electrical connection to the plates will be retained.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
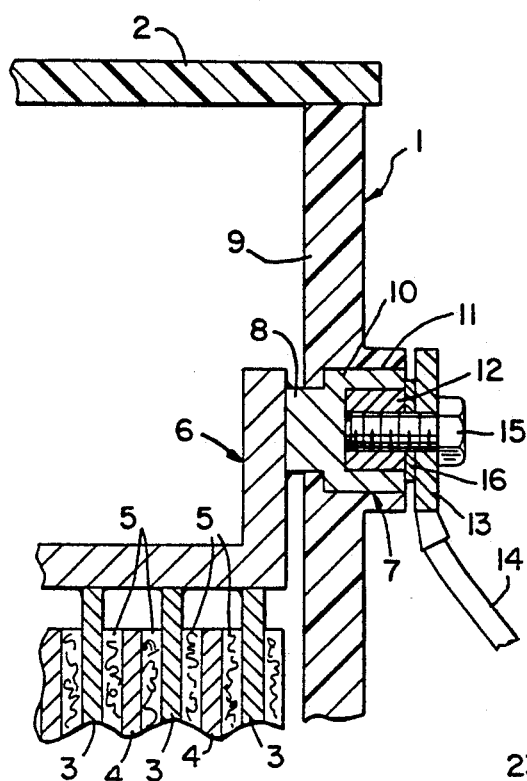
FIG. 1 is a fragmentary vertical section of a prior art lead-acid battery showing a conventional side terminal construction.

FIG. 1 illustrates a standard, prior art lead-acid battery incorporating a conventional side terminal construction. The battery includes an open-top case 1, the upper end of which is enclosed by a cover 2. The case and cover are preferably formed of a dielectric material, such as polypropylene, or the like.

A plurality of spaced parallel positive plates 3 are mounted in case 1, while a series of negative plates 4 are located between the positive plates, and separated from the positive plates by separators 5 which are formed of a porous, electrical insulating material, such as plastic or fiber glass. A liquid electrolyte such as sulfuric acid is impregnated within the separators.

As shown in FIG. 1, the prior art side terminal construction includes a metal strap 6 which is connected to tabs on the upper edges of the positive plates 4 and the strap 6 is welded to the inner end of a conductive bushing 7 of one side terminal. Similarly, a second strap (not shown), similar to strap 6, is connected to the negative plates of the battery and is secured to the inner end of a bushing 7 of a second terminal.

As seen in FIG. 1 each bushing 7, normally composed of a lead alloy, has a small diameter end 8 which extends through an opening in the side wall 9 of case 1, while the outer large diameter end 10 of the bushing is retained within a recess 11 in the side wall. Mounted within a cylindrical recess in the outer surface of large diameter end 10 is a metal nut 12, preferably formed of stainless steel, and a clamping ring 13 attached to cable 14 is secured to bushing 7 by a bolt 15, which extends through the ring 13 and is threaded in nut 12. Lock washer 16 can be located between ring 13 and the outer face of bushing 7.

The nut 12, as used in the typical prior art side terminal construction, has a relatively shallow depth and it has been found that if the original bolt 15 is lost of misplaced, the user will frequently substitute a bolt of greater length. When threading down the bolt, the inner end of the bolt will bottom out in the recess in bushing 7 and when further torque is applied to the bolt, the inner end 8 of the lead bushing 7 will deform with the result that the welded connection between end 8 and strap 6 can fracture.

Figure 2:
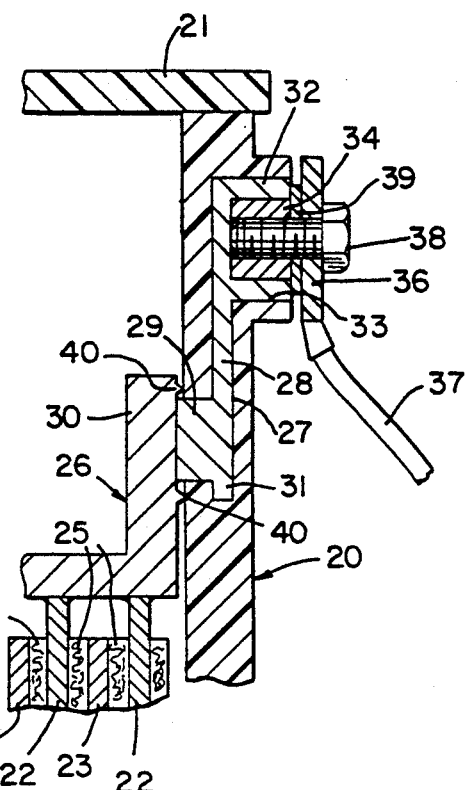
FIG. 2 is a fragmentary vertical section showing the improved side terminal construction of the invention.

FIG. 2 shows the side terminal construction of the invention which overcomes the problems associated with the prior art design when using a longer-than-required bolt. The battery of FIG. 2 is a standard lead-acid type having an open-top case 20, which is enclosed with a cover 21. Both the case and the cover are formed of a dielectric material, such as polypropylene, or the like. Located within the case 20 is a group of positive plates 22 formed of lead dioxide and a group of negative plates 23 formed of sponge lead. The negative plates are interposed between the positive plates and separated from the positive plates by separator layers 25, which are formed of an electrically insulating material, such as plastic, fiber glass, or the like. The typical lead acid battery includes an electrolyte, such as sulfuric acid, which is impregnated within the separators.

As the battery discharges when connected to an external load, the lead in the positive plates combines with sulfate ions of the sulfuric acid forming lead sulfate at the positive plates, while oxygen of the positive plates combines with hydrogen from the sulfuric acid to form water which reduces the concentration of acid in the electrolyte. A similar reaction occurs at the negative plates during discharge in which lead combines with the sulfate ions to form lead sulfate on the negative plates.

On recharging, the reactions are reversed with the lead sulfate in both the positive and negative plates being split into its original form of lead and sulfate, while water is broken down into hydrogen gas and oxygen, with the hydrogen reacting with the sulfate ions to produce sulfuric acid and the oxygen combining with the lead of the positive plates to form lead dioxide.

The upper edges of positive plates 22 are formed with tabs which are welded or otherwise secured to a metal strap 26 and similarly the upper edges of negative plates 23 are provided with tabs that are welded to a second strap 26, not shown Each side terminal of the battery shown in FIG. 2 consists of an electrically conductive elongated bar 27, preferably formed of a lead alloy. Bar 27 includes a central section 28 and has a generally cylindrical inner end 29 which projects inwardly of the side wall of the case and is connected to the vertical leg 30 of strap 26, preferably by spot welding. As shown in FIG. 2, the central section 28 of conductor bar 27 is embedded within the side wall of casing 20, and the end 29 includes a generally annular flange 31, which serves as a locator and positions the inner face of end 29 relative to the inner surface of side wall 9.

Figure 4:
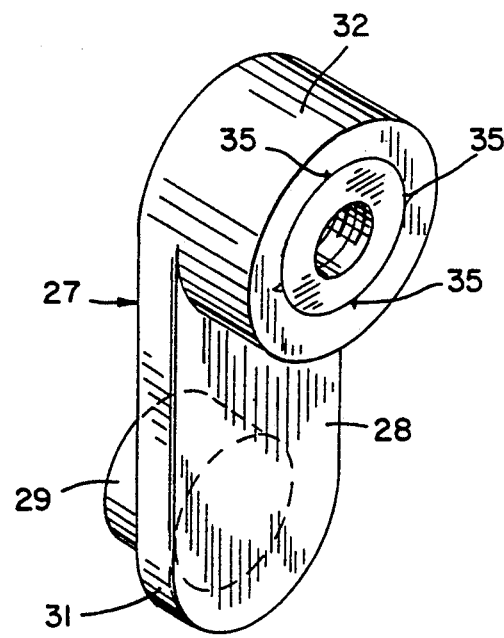
FIG. 4 is a perspective view of the conductor bar.

The opposite or outer end 32 of conductor bar 27 is generally cylindrical in shape and is offset laterally from end 29. End 32 is located in a generally cup-shaped recess 33 formed in side wall of casing 20 and end 32, in turn, has a smaller outwardly facing recess which receives a metal nut 34, preferably formed of stainless steel. To lock the nut 34 relative to the end 32 of conductor bar 27, one or both of the interfaces between the nut and the conductor bar can be provided with serrations or teeth 35, as seen in FIG. 4.

A clamping ring 36, which is connected to a battery cable 37, is attached to the end 32 of conductor bar 27 by bolt 38. Bolt 38 extends through ring 36 and is threaded in nut 34. In addition, a lock washer 39 can be interposed between the clamping ring 36 and the outer face of the end 32.

The surface of the leg 30 of strap 2 facing the side wall of case 20 can be provided with serrations or ribs 40, which engage the inner surface of side wall when the end 29 of the conductor bar is welded to strap 26.

While FIG. 2 shows the end 32 of the conductor bar 27 offset vertically upward from the end 29, it is contemplated that the end 32 can be offset beneath the end 29, or alternately, the conductor bar can be positioned horizontally, so that both the ends 29 and 32 are at the same vertical level.

The upward offset of end 32 with respect to end 29, as shown in FIG. 2, is preferred, because it is more difficult for the liquid electrolyte to leak along the conductor bar 27 to the upper recess 33 in the side wall. Further, having the end 32 at a higher elevation on the casing side wall provides greater accessibility for the side terminal in the engine compartment of an automobile or other vehicle.

Figure 3:
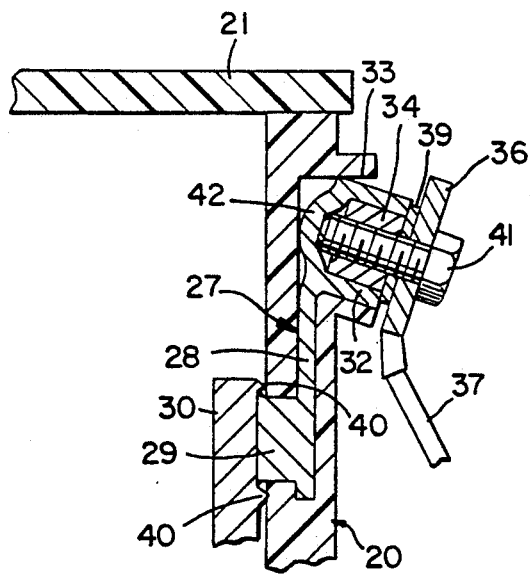
FIG. 3 is a view similar to FIG. 2 showing the deformation of the conductor bar if a longer-than-required bolt is employed.

FIG. 3 illustrates a situation where a longer-than-required bolt 41 is substituted for the original bolt 38 shown in FIG. 2. The nut 34 has a relatively shall depth, and if a replacement bolt is required, the tendency is for the user to utilize a substitute bolt 41 of greater length. When the substitute bolt 41 is threaded in nut 34, the end of the bolt will engage the bottom of the recess in the end 32, and as further torque is applied to the bolt, the bolt will deform the inner surface of end 32 to form a protrusion 42. Continued torque on the bolt will then tend to bend the end 32 outwardly as shown in FIG. 3. While the use of the longer-than-required bolt 41 will deform the outer end 32 of the conductor bar 27, it will not effect the welded connection between end 29 and strap 26, so that the electrical connection between these members will remain intact.

While the drawings have shown the invention as associated with a side terminal of a battery, it is contemplated that in certain instances, the construction can also be used with a top terminal.

Various modes of carrying out the invention are contemplated as being within the scope of the following claims particularly pointing out and distinctly claiming the subject matter which is regarded as the invention.

I claim:

1. In a battery construction, an outer case having a side wall, a plurality of electrode plates disposed in the case, connecting means disposed in the case and connected to said electrode plates, said connecting means having an end extending to a location adjacent to said wall, electrical conducting means embedded in said wall and having a first end extending through an opening in said wall located on the interior of said side wall and connected to said connecting means, said electrically conducting means also having a second end offset from said first end and located on the exterior of said side wall, and attaching means for attaching said second end to an electrical cable.

2. The battery construction of claim 1, wherein said electrically conducting means is composed of a deformable metal.

3. The battery construction of claim 1, wherein said second end is provided with an outwardly facing recess, said attaching means comprising a first attaching member disposed within said recess, and a second attaching member attached to said cable and engageable with said first attaching member.

4. The battery construction of claim 3, wherein said first attaching member comprises a metal nut having an internal thread and said second attaching member comprises a bolt engaged with said thread.

5. The battery construction of claim 1, wherein said electrical conducting means comprises an elongated bar having a central section and said ends are located at opposite extremities of said central section.

6. The battery construction of claim 1, wherein said side wall has an outwardly extending annular boss that surrounds said second end.

7. A battery, comprising an outer case having a side wall, a plurality of positive electrode plates disposed in said case, a plurality of negative electrode plates disposed in side case and spaced from said positive plates, a plurality of separator layers separating said positive and negative plates, an electrolyte disposed within said case and impregnated in said separator layers, a first strap connecting the positive plates, a second strap connecting said negative plates, each of said straps having an end located adjacent said side wall, a pair of electrical conductive elongated bars each having a first end portion extending through an opening in said side wall located on the interior of said side wall and connected to a respective strap, each bar having a second end portion offset from said first end portion and located on the exterior of said side wall, and attaching means for attaching each second end portion to an electrical cable.

8. The battery of claim 7, wherein each bar is composed of a deformable metal.

9. The battery of claim 8, wherein the second end portion of each bar is provided with an outwardly facing recess, and said attaching means comprises a ferrous metal nut disposed in said recess, and a bolt threaded in said nut and engaged with said cable.

10. The battery of claim 7, wherein said second end portion is located at a vertical level above said first end portion.

11. The battery of claim 7, wherein each bar also includes a central section connecting said end portions, said central section being embedded in said side wall.

12. The battery of claim 11, wherein said first and second end portions are generally cylindrical in shape and extend in opposite directions from said central section.

13. The battery of claim 12, and including a flange extending radially from said first end portion and spaced from the inner surface of said first end portion, said flange being embedded in said side wall and serving to locate the inner surface of said first end portion relative to the inner surface of said side wall.

* * * * *

UNITED STATES PATENT AND TRADEMARK OFFICE
CERTIFICATE OF CORRECTION

PATENT NO. : 5,281,493
DATED : January 25, 1994
INVENTOR(S) : KENNETH R. JONES

It is certified that error appears in the above-indentified patent and that said Letters Patent is hereby corrected as shown below:

Col. 4, Line 58, CLAIM 1, Before "wall" insert --side--;
Col. 4, Line 59, CLAIM 1, Before "wall" insert --side--;
Col. 4, Line 60, CLAIM 1, Before "wall" insert --side--.

Signed and Sealed this

Thirtieth Day of August, 1994

Attest:

BRUCE LEHMAN

Attesting Officer     Commissioner of Patents and Trademarks